US006548609B2

(12) United States Patent
Ramírez-de-Arellano-Aburto et al.

(10) Patent No.: US 6,548,609 B2
(45) Date of Patent: Apr. 15, 2003

(54) PROCESS FOR THE PRODUCTION OF OLEOCHEMICAL POLYOLS

(75) Inventors: Nicolás Ramírez-de-Arellano-Aburto, Edo. de Mexico (MX); Andrés Cohen-Barki, Edo. de Mexico (MX); M. Javier Cruz-Gómez, Mexico D.F. (MX)

(73) Assignee: Resinas Y Materiales S.A. De C.V., Edo. de Mexico (MX)

( * ) Notice: Subject to any disclaimer, the term of this patent is extended or adjusted under 35 U.S.C. 154(b) by 0 days.

(21) Appl. No.: 09/989,464

(22) Filed: Nov. 21, 2001

(65) Prior Publication Data

US 2002/0099230 A1 Jul. 25, 2002

(51) Int. Cl.$^7$ .............................................. C08F 283/00
(52) U.S. Cl. ........................ 525/530; 521/130; 521/137; 554/124; 554/149; 554/170; 554/213; 554/227
(58) Field of Search ............................... 554/227, 213, 554/170, 149, 124; 521/130, 137; 525/530

(56) References Cited

U.S. PATENT DOCUMENTS

| | | | | |
|---|---|---|---|---|
| 4,542,165 A | * | 9/1985 | Kumata et al. | |
| 4,717,738 A | * | 1/1988 | Fukuda et al. | |
| 4,742,087 A | * | 5/1988 | Kluth et al. | |
| 5,324,846 A | * | 6/1994 | Hirshman et al. | |
| 5,973,082 A | * | 10/1999 | Elmore et al. | |

* cited by examiner

Primary Examiner—Deborah D. Carr

(57) ABSTRACT

The present invention is related to an improved process for obtaining oleochemical polyols from oils, principally of a vegetable origin. The polyols obtained consist of a mixture of ethers, esters, primary and secondary alcohols and have the characteristic of being self-compatible with the new blowing agents: hydrochlorofluorocarbons, HCFC's, hydrofluorocarbons, HFC's and hydrocarbons, HC's of a low molecular weight and low boiling point. The process of this invention is characterized because it uses Lewis type acids in such a way that they do not form precipitates and therefore it is not necessary to remove precipitates from the polyol. The process of the present invention makes it possible to obtain polyols with high functionality and controlled reactivity. These characteristics render the product suitable for use as a raw material in the production process of rigid foams, such as polyurethane for spraying, refrigeration and imitation wood, coatings, among others.

16 Claims, No Drawings

PROCESS FOR THE PRODUCTION OF OLEOCHEMICAL POLYOLS

TECHNICAL FIELD OF THE INVENTION

The present invention is related to the field of chemistry, and in particular to a process for obtaining polyols of a type known as oleochemicals that are obtained from oils such as safflower, sunflower, linseed, palm and soy oil, among others, that are self-compatible with hydrochlorofluorocarbons, hydrofluorocarbons and hydrocarbons in which the polyols obtained may be adequately used to produce, among other products, polyurethane and/or polyisocyanurate foams highly crosslinked due to their high functionality.

BACKGROUND OF THE INVENTION

The polyols used in manufacturing rigid or flexible polyurethane foam are fundamentally chemicals based on polyethers or polyesters. Polyethers are manufactured from low molecular weight polyalcohols and ethylene and/or propylene oxides. Polyesters are manufactured by means of the esterification and/or transesterification of compounds containing phthaloyl and/or isophthaloyl and/or terephthaloyl radicals and other aliphatic compounds or similar aromatics with dialcohols and/or polyalcohols. The main applications for polyether or polyester polyols and for oleochemical polyols that are described further on are for the manufacture of rigid foams for the construction of heat-insulating walls as in refrigerators and construction panels. These polyols can also be used as one of the components of a mixture of polyols to produce different types of construction panels. Examples of polyols that are prepared from terephthaloyl radicals are those described in U.S. Pat. No. 3,647,759 (Walker), U.S. Pat. No. 4,237,208 (DeGiuseppi et al.), and U.S. Pat. No. 4,346,229 (Derret et al.). Said inventions have the common basis of a raw material consisting of a residue from the manufacturing process of dimethyl trephthalate. However, said inventions differ from one another in that U.S. Pat. No. 3,647,759 uses monoethylene, U.S. Pat. No. 4,237,208 uses diethylene glycol, while dipropylene glycol is used in the process described in U.S. Pat. No. 4,346,229.

U.S. Pat. No. 4,048,104 (Svoboda et al.) describes a process for polyol production. In this patent the use is described of diethylene glycol in addition to a source of terephthaloyl radicals from pieces of poly(ethylene terephthalate) that is obtained from the collection of bottles of said polymer, also known as PET bottles. Indeed, this modality consists of an option to chemical recycling processes for PET bottles.

In all the processes described above, the processes for obtaining these polyols use raw materials from different petrochemical processes.

The use of these polyols to date has been of both those of a polyol-polyether type and those of a polyol-polyether type in their foaming processes together with blowing agents such as those of the chlorofluorocarbon type, CFC's. In this way, the process consists of making any of the polyols react with some compound containing an isocyanate radical. It should be pointed out that as of the beginning of the 1980's, it was possible to prove the harmful effects that the indiscriminate use of CFC's, also known as freons, has on the ozone layer. This effect was principally detected in the stratosphere over the South Pole.

As an example of different types of freons that had been used up to that time as blowing agents, it is possible to mention trichlorofluoromethane (Freon 11), dichlorodifluoromethane (Freon 12), and chlorodifluoromethane (Freon 22), among others. In 1987, with the Montreal Protocol, it was agreed to definitively suspend the use of completely Halogenated carbon compounds or freons in all their applications, including their use as blowing agents in polyurethane foams. Since then other types of compounds have been produced, including a type of freon, such as hydrochlorofluorocarbons, HCFC's, an example of which is 1,1,1-dicholorofluoroethane, (Freon 141b); and compounds without chlorine or hydrofluorocarbons, HFC's, such as 1,1,1,4,4,4-hexafluorobutane (Freon-356), and even some compounds without chlorine or fluorine, hydrocarbons.

Use has also been made of hydrocarbons (HC's) with a low molecular weight and low boiling point, such as n-pentane, n-hexane, and cyclopentane, among others, with the characteristic that these compounds cause no effects to the ozone layer.

A consequence of the foregoing has been that most of the polyols of the polyether and polyester type that had been obtained until then by methods like those referred to at the beginning of this section had a very low level of compatibility with the new blowing agents. The need then appeared to use "compatibilizing agents" to make said compounds more alike or chemically more adequate.

A further alternative has been the exploration of new ways of synthesizing new polyol families that would be self-compatible, above all with more ecologically adequate blowing agents. In order to produce compatibilizing agents and/or self-compatible polyols with the new HCFC's, HFC's and HC's, processes were developed for the manufacture of oleochemical polyols, also known as polyurethane prepolymers.

In the manufacturing processes of these polyols different mineral or organic acids such as sulphuric, phosphoric, sulphinic acids, etc., are used as catalyzers. All these acids can be classified as Brönsted acids. These acids have catalytic effects not only on the reaction of an alcohol with an oxyrane ring but also on the opening of the oxyrane ring in the presence of humidity and subsequently during the foaming process. These acid catalyzers must therefore be inhibited or neutralized with alkaline alcoholates, such as sodium methoxide. The solids, produced by the neutralization of the catalyzer, must be removed by filtration.

In these processes, monohydric alcohols are principally used and, on some occasions, polyhydric alcohols are also employed to open the oxyrane ring and produce a functional group of secondary alcohol, together with another functional group of ether. In polyurethane foam manufacturing, it is well known that, for the same formulation of the first component and the isocyanate component, the crossed density and therefore the hardness of the polyurethane increases when the functionality of the polyol used in the formulation of the polyurethane foam is increased.

One example of this type of process is the one described in U.S. Pat. No. 4,508,853 (Kluth and Meffert), in which it is also necessary to have a molar proportion of the epoxidate with an excess of alcohol 2 to 10 times more than the amount stoichiometrically necessary, based on the epoxidate groups (3.8.10).

However, most of the polyether, polyester and oleochemical polyols have shown poor functionality to date, that is a functionality less than 5 and, in many cases, less than or the same as 3. These polyols must be mixed with other high functionality polyols so that when the mixture is foamed they can become a polyurethane with a high degree of crosslinking.

From the above, it can be deduced that there is a need to have a better, more adequate technology with which to obtain polyols that complies with the requirements of quality, chemical functionality and affinity with materials used as blowing agents that do not harm the atmosphere.

It is therefore an object of the present invention to provide an option of raw materials that come from a source other than petroleum since this is not renewable.

Another object of this invention is to provide a new family of polyols that are obtained from the above mentioned raw materials and that are compatible with blowing agents such as HCFC's, HFC's and HC's, as the result of the ecological restriction of using the traditional freons.

An additional object of this invention is to provide a process for obtaining oleochemical polyols whose processing method does not need to use Brönsted acids that have the disadvantage of producing a precipitate that must be filtered. These process should be more efficient and simple, in order to facilitate the conversion of raw materials into products.

Yet another object of the present invention is to provide a process for obtaining polyols suitable for producing different types of polyurethane and polyisocyanurate foams.

A further object of the present invention is to provide a process for obtaining polyols that provide high degrees of crosslinking in said foams.

An additional object of the present invention is to provide a process for obtaining polyols that provide high degrees of crosslinking in said foams produced by the high functionality of the polyol.

DESCRIPTION OF THE INVENTION

The present invention refers to the process for obtaining oleochemical polyols from natural oils, principally oils of the safflower, sunflower, linseed, palm and soybean type, among others; either alone or in a mixture. In accordance with the present invention, the oils in question are epoxydized by means of any of the already known industrial processes. They use an organic acid with hydrogen peroxide or a per-acid such as peracetic acid or other similar ones.

The present process, object of the invention begins with an oil that has already been epoxydized or a mixture of organic esters of previously epoxydized unsaturated acids. The preferred raw materials are epoxydized soybean oil with an oxyrane number of 5.8 to 7.2, epoxydized sunflower oil with an oxyrane number of 5.6 to 7.2 and epoxydized linseed oil with an oxyrane number of between 8.0 and 10.0.

In accordance with the present invention, the catalytic system used consists of a mixture of the following Lewis transesterification acids or at least one of them, such as: tetraoctyl titanate, tetrabutyl titanate, triphenyl phosphite and tetraisopropyl titanate, among others.

With respect to these Lewis acids, the flat structure of the molecule of these substances has a certain influence on the catalytic mechanism of the present process. The reactants used to open the oxyrane ring of the epoxydized oils is one, or rather a mixture, of the following dialcohols, polyalcohols and alcoholamines: Monoethylenglycol, diethylenglycol, triethylenglycol, polyethylenglycol, monopropylenglycol, dipropylenglycol, polypropylenglycol, 1,3-propanodiol, 1,4-butylenglycol, 1,6-hexanodiol, hexylenglycol (4-methyl, 2,4-pentanodiol), glycerin, sorbitol, pentaerytritol, etc.

The oleochemical polyol prepared using the present process from an epoxydized oil, a catalyst or a mixture of Lewis acid type catalysts and one, or a mixture of, dialcohol(s), polyalcohol(s) and amine alcohol(s) is a viscous mixture with an hydroxyl number of 100 to 450 mg/g in which more than 80% of the oxyrane rings initially present in the epoxydized oil have reacted to produce secondary and primary alcohols. The number of the residual oxyrane in the polyol is 0.3 to 2.5 in % of oxygen weight with respect to the initial weight of the epoxydized polyol.

The Lewis acids used in the preparation of the polyols mentioned above do not form precipitates nor turbidity in the polyol and are used in such a small quantity that they do not need to be removed from the polyol neither do they have a negative influence on the catalysis used during the reaction of the formation of polyurethane foam from the polyols mentioned above and different isocyanates.

The oleochemical polyol prepared by means of the process described above was analyzed using gel permeation chromatography, GPC, and nuclear magnetic resonance, NMR, of both hydrogen 1 and carbon 13.

By means of NMR, it was possible to observe that the polyol is a mixture of:

a) Polyesters that are the result of the partial transesterification of the glycerin triester that originally comprised the vegetable oil or a mixture of vegetable oils, which were used for manufacturing the polyol;

b) Secondary alcohols and ethers, a product of the reaction of opening the oxyrane rings between one or rather a mixture of dialcohols, polyalcohols and alcoholamines, with one or a mixture of epoxydized oil(s). The oxyrane rings mentioned above are previously formed from the double bonds of the vegetable oil(s) used by means of a normal epoxidation reaction of the domain of those versed in the art of manufacturing epoxydized oils; and c) Primary alcohols that remain from the oxhydryl radicals that have not reacted, which are composed of dialcohols, polyalcohols and alcoholamines, used in the manufacture of the oleochemical polyol. The GPC analysis indicates that the oleochemicals prepared according to the technique shown further on in examples 5 to 7 given in table No. 2 have a molecular weight of 1,100±100 grams per mol. When the weight of an equivalent is calculated in polyols, values of between 140 and 150 grams per molar equivalent are obtained. Hence, it can be deduced that the average functionality of the oleochemical polyols produced in this process is 7 to 8.5.

The improved process for the manufacture of polyols described here permits an adequate control of both reactivity and the functionality of the oleochemical polyol. The different degrees of reactivity are those that facilitate the possibility of using the present polyol in the manufacture of rigid polyurethane foams for spraying, refrigeration and imitation wood.

A high functionality, greater than 7, in the polyol gives the foam an adequate structure, with a high percentage of closed cells and high dimensional stability. Due to the chemical structure of the polyol, the foam does not present friability and, as happens in several of the formulations, it has a semi rubber-like appearance.

EXAMPLES

In accordance with the foregoing, the process of the present invention was implemented into practical applications with the objective of obtaining a series of oleochemical polyols like those listed in tables 1 and 2, which were produced as follows:

TABLE NO. 1

Oleochemical Polyols

| Example No. Materials loaded: | 1 | 2 | 3 | 4 |
|---|---|---|---|---|
| Initial raw material, epoxydized soybean oil, g | 1,000 | 1,000 | 3,158.0 | 844.0 |
| Monoethanol amine, g | 26.0 | 26.0 | 164.0 | 22.0 |
| Diethylenglycol, g | 406.0 | 315.0 | 975.0 | 266.0 |
| Pentaerytritol, g | | 116.0 | 183.0 | |
| Sorbitol, g | | | | 68.0 |
| Triphenyl phosphite, g | 1.43 | 1.5 | 2.25 | 1.2 |
| Tetrabutyl titanate, g | 0.71 | 0.75 | 4.5 | 0.63 |

TABLE NO. 2

Oleochemical Polyols

| Example No. Parameter | 5 | 6 | 7 |
|---|---|---|---|
| Initial raw material, soy epoxidate, kg | 100.0 | 100.0 | 83.0 |
| Monoethanol amine, kg | 3.0 | 3.0 | 2.5 |
| Diethyleneglycol, kg | 41.0 | 41.0 | 34.0 |
| Butyl isopropyl titanate, g | | | 58.0 |
| Triphenyl phosphite, g | 100.0 | 140.0 | 116.0 |
| Tetrabutyl titanate, g | 50.0 | 70.0 | |

The materials loaded in a reactor, according to Examples 1 to 4 and 5 to 7 of Tables 1 and 2, respectively, were allowed to react at the temperature and during the reaction time listed in the first two lines of Table 3. The polyol obtained at the end of this reaction time are referred to by their example numbers in Tables 1 and 2.

Table 3 lists some parameters of the process, as well as the result of the characterization analyses that were performed on the oleochemical polyol obtained.

Table 4 shows preferred ratios for using the polyol of examples 3, 4 and 6 with some of the most common inflating agents.

TABLE 3

Process Parameters and Results of the Analyses

| Example No. Parameter | 1 | 2 | 3 | 4 | 5 | 6 | 7 |
|---|---|---|---|---|---|---|---|
| Reaction temperature, ° C. | 232 | 235 | 223 | 226 | 239 | 240 | 240 |
| Reaction time, hr | 4.0 | 4.0 | 3.0 | 4.5 | 5.0 | 5.0 | 7.0 |
| Initial oxyrane No., % | 6.9 | 6.8 | 6.9 | 6.8 | 6.9 | 6.8 | 6.9 |
| Oxyrane No. after 2 hr, % | 3.2 | 2.3 | 2.0 | 2.3 | 2.3 | 2.1 | 3.0 |
| Final oxyrane No., % | 1.2 | 0.9 | 1.7 | 1.2 | 1.0 | 0.8 | 0.7 |
| No. of OH, mg of KOH/g | 411 | 418 | 410 | 409 | 389 | 375 | 370 |
| Viscosity, mPa-s | 1500 | 2540 | 2230 | 3600 | 1520 | 1350 | 1570 |
| No. of acid, mg of KOH/g | 0.4 | 1.9 | 2.1 | 0.5 | 1.0 | 1.2 | 1.3 |

TABLE NO. 4

Preferred Ratios for Using the Polyol of Examples 3, 4 and 6 With Some of the Most Common Blowing Agents.

| Example No. Blowing Agent | 3 | 4 | 6 |
|---|---|---|---|
| n-hexane, pphp* | 19.5 | 24.6 | 20.7 |
| 1,1,1-dichlorofluoroethane, pphp* | 21.2 | 168.2 | 100 |
| cyclopentane, pphp* | | | 47.6 |
| n-pentane, pphp* | | | 16.4 |

*pphp means parts by weight of blowing or inflating agent compatible per one hundred parts (by weight) of polyol Foams were prepared with the polyols of Examples 5, 6, and 7 according to Tables 1, 2 and 3 in order to be used in applications such as refrigeration and imitation wood. In all cases very good examples of polyurethane foams were obtained using methylene diphenyl diisocyantate (polymeric MDI). By way of example of polyol applications, Table 5 below shows typical formulations for the aforementioned applications.

TABLE NO. 5

Typical formulations of Polyurethanes from Oleochemical Polyols

| | Foam application Parameters | Spraying | Refrigeration | Imitation Wood |
|---|---|---|---|---|
| 1 | Oleochemical polyols of examples 5, 6 and 7, g | 60.96 | 35 | 65 |
| 2 | Rymsapol R-360, g | 26.12 | | 30 |
| 3 | Rymsapol R-234-R | | 15 | |
| 4 | Water, g | 1.742 | 1.0 | 0.25 |
| 5 | Triethanol amine, g | 0.8709 | 0.5 | |
| 6 | Triethylene glycol | | | 5.0 |
| 7 | Tense-active agent, g | 0.8709 | 0.75 | 0.05 |
| 8 | Aminic catalyst, g | 0.3483 | 0.3 | 0.2 |
| 9 | Organo-metallic catalyst, g | 0.7838 | | |
| 10 | Dimethyl ethanolamine, g | 0.8709 | | |
| 11 | Tris phosphate, 2-chloropropyl, g | 5.2254 | | |
| 12 | 1,1,1-dichlorofluoroethane, g | 12.9200 | 7.5 | 3.75 |
| 13 | Polymeric MDI*, g | 110.7 | 60.05 | 114.7 |
| 14 | Cream time, s | 4 | 13 | 60 |
| 15 | Thread time | | 126 | 149 |
| 16 | Cure time, s | 9 | 140 | 167 |

TABLE NO. 5-continued

Typical formulations of Polyurethanes from Oleochemical Polyols

| Foam application Parameters | Spraying | Refrigeration | Imitation Wood |
|---|---|---|---|
| 17 Density of fam in free growth, Kg/M³ | 25 | 25 | 110 |

What is claimed is:

1. A process for the production of an oleochemical polyol, which comprises
   epoxidation of a vegetable oil using an organic acid together with oxygenated or a per-acid to obtain an epoxydized oil and
   reacting said epoxydized oil with a dialcohol, a polyalcohol, an alcoholamine, or a mixture thereof wherein said reaction is carried out in the presence of a planar Lewis acid catalyst.

2. The process of claim 1, wherein said epoxydized oil comprises a mixture of organic esters of epoxydized unsaturated acids.

3. The process of claim 1, where said vegetable oil is a pure oil or a mixture of vegetable oils.

4. The process of claim 1, wherein said per-acid is peracetic acid.

5. The process of claim 1, wherein said vegetable oil is safflower oil, sunflower oil, linseed oil, palm oil or soybean oil.

6. The process of claim 1, wherein said epoxydized oil has an oxyrane number between about 4.0 and about 10.0.

7. The process of claim 1, wherein said planar Lewis acids is at least one selected from the group consisting of tetraoctyl titanate, tetrabutyl titanate, triphenyl phosphite and tetraisopropyl titanate.

8. The process of claim 1, further comprising reacting said epoxydized oil with at least one selected from the group consisting of monoethylenglycol, diethylenglycol, triethylenglycol, polyethylenglycol, monopropylenglycol, dipropylenglycol, polypropylenglycol, 1,3-propanodiol, 1,4-butylenglycol, 1,6-hexanodiol, hexylenglycol, glycerin, sorbitol and pentaerytritol.

9. The process of claim 1, wherein said polyol has a hydroxyl number from about 100 to about 450 mg/g in which more than about 80% of oxyrane rings initially present in the epoxydized oil react to produce secondary and primary alcohols.

10. The process of claim 9, wherein a residual oxyrane number in the polyol is about 0.3 to about 2.5 weight % of oxygen with respect to an initial weight of the epoxydized polyol.

11. The process of claim 1, wherein said polyol does not inhibit a catalyst used during formation of a polyurethane foam.

12. The process of claim 1, wherein said polyol has a functionality greater than about 5.

13. A method for the production of a foamed polymer, comprising
    epoxidation of a vegetable oil using an organic acid together with oxygenated water or a per-acid to obtain an epoxydized oil,
    reacting said epoxydized oil with any one or a mixture of a dialcohol, a polyalcohol, or an alcoholamine to form a polyol, wherein said reaction is carried out in the presence of a planar Lewis acid catalyst,
    reacting said polyol with a diisocyanate component in the presence of a hydrochlorofluorocarbon, a hydrofluorocarbon or a hydrocarbon with a low boiling point, thereby producing a foamed polymer,
    wherein said polyol is compatible with said hydrochlorofluorocarbon, hydrofluorocarbon or hydrocarbon, without the use of an agent to make said polyol compatible with said hydrochlorofluorocarbon, hydrofluorocarbon or hydrocarbon.

14. The process of claim 13, wherein said foamed polymer is a polyurethane.

15. The process of claim 13, wherein said polyol has a functionality greater than about 5.

16. A process for the production of an oleochemical polyol, which comprises
    epoxidation of a vegetable oil using an organic acid together with oxygenated water or a per-acid to obtain an epoxydized oil,
    reacting said epoxydized oil with a dialcohol, a polyalcohol, an alcoholamine, or a mixture thereof wherein said reaction is carried out in the presence of a planar Lewis acid catalyst, thereby producing said oleochemical polyol,
    wherein said oleochemical polyol has a functionality greater than about 5.

* * * * *